United States Patent
Kausch

(10) Patent No.: US 8,998,260 B2
(45) Date of Patent: Apr. 7, 2015

(54) FRAME SUPPORT, SUSPENSION STOP, AND METHOD OF IMPROVING A MOTOR VEHICLE

(71) Applicant: Corey M. Kausch, San Juan Capistrano, CA (US)

(72) Inventor: Corey M. Kausch, San Juan Capistrano, CA (US)

( * ) Notice: Subject to any disclaimer, the term of this patent is extended or adjusted under 35 U.S.C. 154(b) by 0 days.

(21) Appl. No.: 13/774,506

(22) Filed: Feb. 22, 2013

(65) Prior Publication Data

US 2013/0221648 A1 Aug. 29, 2013

Related U.S. Application Data

(60) Provisional application No. 61/603,124, filed on Feb. 24, 2012.

(51) Int. Cl.
 *B62D 21/11* (2006.01)
 *B62D 21/12* (2006.01)

(52) U.S. Cl.
 CPC ...................................... *B62D 21/11* (2013.01)

(58) Field of Classification Search
 USPC .......... 280/781, 785, 124.1, 124.109, 124.11, 280/124.112, 124.177; 267/33, 116, 120, 267/233
 See application file for complete search history.

(56) References Cited

U.S. PATENT DOCUMENTS

| | | | | |
|---|---|---|---|---|
| 4,796,910 A | * | 1/1989 | Starr, Sr. ................ | 280/124.165 |
| 5,203,585 A | * | 4/1993 | Pierce .................... | 280/124.116 |
| 6,070,861 A | * | 6/2000 | Ecktman ......................... | 60/778 |
| 7,140,601 B2 | * | 11/2006 | Nesbitt et al. .............. | 267/64.13 |
| 8,272,653 B2 | * | 9/2012 | Falkner et al. ......... | 280/124.145 |
| 2006/0027954 A1 | * | 2/2006 | Nesbitt et al. .............. | 267/64.11 |
| 2010/0307329 A1 | * | 12/2010 | Kaswen et al. ............. | 89/36.08 |
| 2010/0327548 A1 | * | 12/2010 | Falkner et al. ............. | 280/124.1 |
| 2011/0233887 A1 | * | 9/2011 | Pronsias Timoney et al. ......................... | 280/124.1 |

OTHER PUBLICATIONS

Teraflex Speed Bumps (A product of Teraflex available via Teraflex. biz website) [online]. Teraflex, Inc. Murray, Utah [retrieved Oct. 21, 2013]. Retrieved from the Internet: <URL: http://www.teraflex.biz/jk-speedbumps-3-4-lift-front.html>.*

(Continued)

*Primary Examiner* — Ruth Ilan
*Assistant Examiner* — Barry Gooden, Jr.
(74) *Attorney, Agent, or Firm* — Bryan Cave LLP; Allan W. Watts

(57) ABSTRACT

An apparatus, kit, and method for improving a motor vehicle. Embodiments include right and left frame supports, a cross beam, and two mounts for air bump stops, for instance, outboard of the vehicle frame. Damage to the frame can be prevented in severe suspension impacts and vehicle handling and performance can be improved both on and off road surfaces. Certain embodiments include impact pads clamped to the axle of the vehicle, hardware or bolts that attach components together or to the frame of the vehicle, or a combination thereof. Components can be configured to attach to the vehicle frame. Particular embodiments support the frame at the top, bottom, outboard side, or a combination thereof, and some frame supports have a channel portion, a hollow box portion, and two parallel gusset plates, for example. In some embodiments, the cross beam can fit between and attach to the gusset plates.

19 Claims, 10 Drawing Sheets

(56) References Cited

OTHER PUBLICATIONS

Teraflex Speed Bumps Installation Video (An installation video of the Teraflex Speed Bumps available via Terflex.biz and Youtube.com websites, contains publication date of Nov. 30, 2010) [online]. Teraflex, Inc. Murray Utah [retrieved Oct. 21, 2013]. Retrieved from the Internet: <URL: http://www.youtube.com/watch?v=6PF1Rwwe7WE>.*

Jeep Wrangler Frame pictures. Retrieved from the Internet: <URL: http://www.jeep.com/en/2013/wrangler_unlimited/safety_security/safety_security_tour/>.*

* cited by examiner

FRAME SUPPORT, SUSPENSION STOP, AND METHOD OF IMPROVING A MOTOR VEHICLE

RELATED PATENT APPLICATIONS

This patent application claims priority to Provisional Patent Application No. 61/603,124, filed on Feb. 24, 2012, titled FRAME SUPPORT WITH VEHICLE SUSPENSION STOP AND CROSS BEAM, having a common inventor. The contents of this priority patent application are incorporated herein by reference.

FIELD THE INVENTION

This invention relates to automotive suspension and structural systems and components and to kits, products, and methods of improving motor vehicles.

BACKGROUND OF THE INVENTION

Various components have been added to motor vehicles to improve the vehicles or to improve their performance including a number of suspension components. Air bump stops, or simply "air bumps" have been added to vehicles to absorb energy when the vehicle suspension bottoms out, for example, when the wheel of the vehicle hits a bump in the road or ground surface that the vehicle is driving on, or the vehicle impacts with the road or ground after becoming partially or fully airborne from traveling over a bump. Air bump stops typically absorb more energy and provide less rebound that rubber bump stops provided on most stock vehicles. Air bump stops have been sold in kits and mounted from the frames of vehicles, and air bump impact pads have been attached to the axles of vehicles below the air bump stops so that the air bump stop impacts with the impact pad when the corresponding wheel of the vehicle hits a bump. Air bump stops have been found to be particularly beneficial on vehicles that are driven on rough or uneven surfaces at a relatively-high speed. Air bump stops have been installed, for example, on vehicles that are often driven off road, such as light-duty trucks, including pickup trucks and sport utility vehicles (SUVs). Further, air bump stops have been added to vehicles used for off-road racing. On the other hand, air bump stops have also been used on vehicles used primarily or exclusively on streets and highways.

Despite the benefit of air bump stops, however, the force generated when a vehicle hits a bump and the air bump stop impacts with impact pad has damaged the frames of vehicles to which air bump stops have been added. Specifically, severe impacts have fatigued, cracked, twisted, or bent (or a combination thereof) the frame of the vehicle. In addition, elastic deformation of the frame has reduced the energy-absorbing potential or capability of air bump stops. As a result, a need or potential for improvement exists for an apparatus that can be added to a vehicle to support the frame of the vehicle and to provide robust mounts for air bump stops. Further, potential for benefit or improvement exists for such an apparatus to be stiff, strong, fatigue resistant, relatively easy to install on a vehicle, relatively inexpensive, relatively easy to manufacture, relatively light weight, and sufficiently compact for shipping. Moreover, a need or potential for improvement exists for a kit that contains various components needed to support the frame of a vehicle while providing mounts for air bump stops, to improve the vehicle or the performance of the vehicle. Further, various needs or potential for improvement exists for particular methods of improving vehicles or the performance of a vehicle that include supporting the frame of the vehicle and providing mounts for air bump stops. Other needs or potential for benefit or improvement may also be described herein or known in the automotive performance industry. Room for improvement exists over the prior art in these and other areas that may be apparent to a person of ordinary skill in the art having studied this document.

Figure 1:
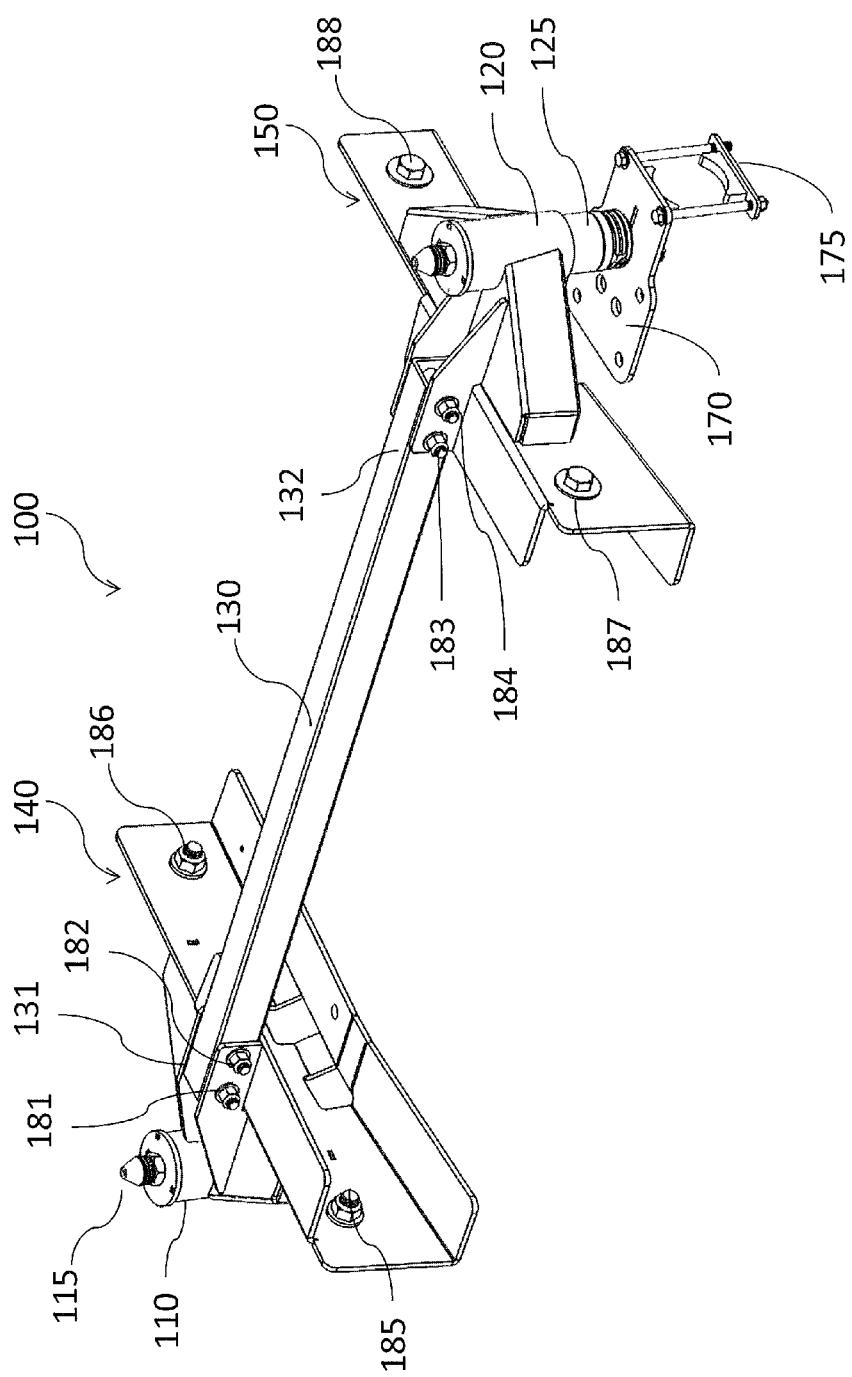
FIG. 1 is an isometric view of an assembled kit or an apparatus for improving a motor vehicle.

These drawings illustrate, among other things, examples of certain components and aspects of particular embodiments of the invention. Other embodiments may differ. Various embodiments may include some or all of the components or aspects shown in the drawings, described in the specification, shown or described in other documents that are incorporated by reference, known in the art, or a combination thereof, as examples. Further, embodiments of the invention can include a subcombination of the components shown in any particular drawing, components from multiple drawings, or both.

SUMMARY OF CERTAIN EXAMPLES OF EMBODIMENTS

This invention provides, among other things, various devices, kits, apparatuses, and methods for improving motor vehicles. Different embodiments include two supports, a cross beam, and two air bump stop mounts. Various embodiments provide, for example, as an object or benefit, that they partially or fully address or satisfy one or more of the needs, potential areas for benefit, or opportunities for improvement described herein, or known in the art, as examples. Certain embodiments provide, for example, as objects or benefits, that they improve the performance of motor vehicles, support the frames of the vehicles, and provide mounts for air bump stops. Different embodiments provide an apparatus that is stiff, strong, fatigue resistant, relatively easy to install on a vehicle, relatively inexpensive, relatively easy to manufacture, sufficiently compact for shipping, relatively light weight, or a combination thereof, as examples. Moreover, particular embodiments provide for the addition of air bump stops while reducing the tendency of the frame of the vehicle to fatigue, crack, twist, bent or a combination thereof, as a result of severe impacts to the suspension of the vehicle.

Specific embodiments of the invention provide various kits for improving a motor vehicle having an axle and a frame extending over the axle, the frame include a right frame rail and a left frame rail. Such a kit can include, for example, a right-side frame support, a left-side frame support, and a cross beam. In a number of embodiments, the right-side frame support, when the kit is installed on the motor vehicle, attaches to the right frame rail above the axle and supports the right frame rail. The right-side frame support can also include a first mount for a first air bump stop. Similarly, the left-side frame support, when the kit is installed on the motor vehicle, attaches to the left frame rail above the axle and supports the left frame rail, and the left-side frame support can include a second mount for a second air bump stop. Moreover, the cross beam can have a first end and a second end, and can extend, when the kit is installed on the motor vehicle, substantially parallel to the axle from the right-side frame support to the left-side frame support with the first end attaching to the right-side frame support and the second end attaching to the left-side frame support.

In particular embodiments, such a kit for improving a motor vehicle can further include the first air bump stop and the second air bump stop. Further, certain embodiments can include a first air bump impact pad that, when the kit is installed on the motor vehicle, attaches to the axle below the first air bump stop, a first air bump impact pad clamp that, when the kit is installed on the motor vehicle, attaches the first air bump impact pad to the axle, a second air bump impact pad that, when the kit is installed on the motor vehicle, attaches to the axle below the second air bump stop, and a second air bump impact pad clamp that, when the kit is installed on the motor vehicle, attaches the second air bump impact pad to the axle. Even further, some embodiments further include a first set of hardware that, when the kit is installed on the motor vehicle, attaches the first end of the cross beam to the right-side frame support, and a second set of hardware that, when the kit is installed on the motor vehicle, attaches the second end of the cross beam to the right-side frame support. In a number of embodiments, the kit is shipped without the right-side frame support or the left-side frame support attached to the cross beam. Even further still, in certain embodiments, the kit further includes a third set of hardware that, when the kit is installed on the motor vehicle, attaches the right-side frame support to the right frame rail above the axle, and a fourth set of hardware that, when the kit is installed on the motor vehicle, attaches the left-side frame support to the left frame rail above the axle.

Moreover, in a number of embodiments, the right frame rail has a top, a bottom, an inboard side, and an outboard side, the left frame rail has a top, a bottom, an inboard side, and an outboard side, and when the kit is installed on the motor vehicle, the right-side frame support, that attaches to the right frame rail above the axle, supports the right frame rail at the top, at the bottom, and at the outboard side of the right frame rail, and the left-side frame support, that attaches to the left frame rail above the axle, supports the left frame rail at the top, at the bottom, and at the outboard side of the left frame rail. Furthermore, in particular embodiments, when the kit is installed on the motor vehicle, the first mount for the first air bump stop is on the outboard side of the right frame rail, and the second mount for the second air bump stop is on the outboard side of the left frame rail. Further, in certain embodiments, each of the right-side frame support and the left-side frame support has a substantially horizontal channel portion include a substantially horizontal top flange, a substantially horizontal bottom flange, and a substantially vertical web, a hollow box portion extending from the web to the first mount, the box portion including a box top, and two parallel gusset plates welded to the top flange and to the box top. Still further, in some embodiments, when the kit is installed on the motor vehicle, the first end of the cross beam fits between and attaches to the two parallel gusset plates of the right-side frame support, and the second end of the cross beam fits between and attaches to the two parallel gusset plates of the left-side frame support.

Still other specific embodiments of the invention provide various apparatuses for improving a motor vehicle having an axle and a frame extending over the axle, the frame including a right frame rail and a left frame rail. Such an apparatus can include a right-side frame support having a first mount for a first air bump stop, a left-side frame support having a second mount for a second air bump stop, a cross beam having a first end and a second end, the first air bump stop, the second air bump stop, a first air bump impact pad, a first air bump impact pad clamp, a second air bump impact pad, and a second air bump impact pad clamp.

Further, in a number of such embodiments, the right-side frame support is configured to attach to the right frame rail above the axle, the left-side frame support is configured to attach to the left frame rail above the axle, and the cross beam is configured to extend substantially parallel to the axle, when the kit is installed on the motor vehicle, from the right-side frame support to the left-side frame support, with the first end attaching to the right-side frame support and the second end attaching to the left-side frame support. Even further, in a number of such embodiments, the first air bump impact pad is configured to attach to the axle below the first air bump stop, the first air bump impact pad clamp is configured to attach the first air bump impact pad to the axle, the second air bump impact pad is configured to attach to the axle below the second air bump stop, and the second air bump impact pad clamp is configured to attach the second air bump impact pad to the axle.

Still further, in some embodiments, the right frame rail has a top, a bottom, an inboard side, and an outboard side, the left frame rail has a top, a bottom, an inboard side, and an outboard side, the right-side frame support, that is configured to attach to the right frame rail above the axle, is configured to support the right frame rail at the top, at the bottom, and at the outboard side of the right frame rail, and the left-side frame support, that is configured to attach to the left frame rail above the axle, is configured to support the left frame rail at the top, at the bottom, and at the outboard side of the left frame rail. Even further still, in various embodiments, when the apparatus is installed on the motor vehicle, the first mount for the first air bump stop is on the outboard side of the right frame rail, and the second mount for the second air bump stop is on the outboard side of the left frame rail. Moreover, in particular embodiments an apparatus can further include a first set of hardware for attaching the first end of the cross beam to the right-side frame support, and a second set of hardware for attaching the second end of the cross beam to the right-side frame support, and the apparatus can be shipped without the right-side frame support or the left-side frame support attached to the cross beam. Furthermore, some embodiments further include a third set of hardware for attaching the right-side frame support to the right frame rail above the axle, and a fourth set of hardware for attaching the left-side frame support to the left frame rail above the axle.

Moreover, in a number of embodiments, each of the right-side frame support and the left-side frame support has a channel portion including a first flange, a second flange, and a web. Furthermore, certain embodiments include a hollow box portion extending from the web to the first mount, two parallel gusset plates welded to the first flange and to the box, or both. Further, in particular embodiments, when the apparatus is installed on the motor vehicle, the first end of the cross beam fits between and attaches to the two parallel gusset plates of the right-side frame support, and the second end of the cross beam fits between and attaches to the two parallel gusset plates of the left-side frame support.

Further still, other specific embodiments of the invention provide various methods, for example, of improving a motor vehicle having an axle and a frame extending over the axle, the frame include a right frame rail and a left frame rail. Such a method can include, in any order, for example, at least certain acts. These acts can include acts of attaching a right-side frame support to the right frame rail above the axle, the right-side frame support including a first mount, attaching a left-side frame support to the left frame rail above the axle, the left-side frame support including a second mount, and attaching a cross beam to the right-side frame support and to the left-side frame support so that the cross beam extends from the right-side frame support to the left-side frame support and is substantially parallel to the axle. In addition, a number of embodiments can include acts of attaching a first air bump stop to the first mount on the right-side frame support, and attaching a second air bump stop to the second mount on the left-side frame support.

Further, some embodiments can include acts of attaching a first air bump impact pad to the axle below the first air bump stop using a first air bump impact pad clamp that attaches the first air bump impact pad to the axle, and attaching a second air bump impact pad to the axle below the second air bump stop using a second air bump impact pad clamp that attaches the second air bump impact pad to the axle. Further still, in certain embodiments, the right frame rail has a top, a bottom, an inboard side, and an outboard side, the left frame rail has a top, a bottom, an inboard side, and an outboard side, and the act of attaching the right-side frame support to the right frame rail above the axle includes positioning the first mount for the first air bump stop on the outboard side of the right frame rail, and supporting the right frame rail at least at the bottom and at the outboard side of the right frame rail. Similarly, in a number of embodiments, the act of attaching the left-side frame support to the left frame rail above the axle includes positioning the second mount for the second air bump stop on the outboard side of the left frame rail, and supporting the left frame rail at least at the bottom and at the outboard side of the left frame rail.

Further still, in various embodiments, the act of attaching the cross beam to the right-side frame support and to the left-side frame support so that the cross beam is substantially parallel to the axle can include, (e.g., in any order), fitting a first end of the cross beam between two parallel gusset plates on the right-side frame support, fitting a second end of the cross beam between two parallel gusset plates on the left-side frame support, attaching the first end of the cross beam to the two parallel gusset plates on the right-side frame support, and attaching the second end of the cross beam to the two parallel gusset plates on the left-side frame support. In addition, various other embodiments of the invention are also described herein, and other benefits of certain embodiments may be apparent to a person of ordinary skill in the art.

DETAILED DESCRIPTION OF EXAMPLES OF EMBODIMENTS

FIGS. 1-9 illustrate an example of an apparatus, apparatus 100, for improving a motor vehicle. In the embodiment illustrated, apparatus 100 is a vehicle frame support that aids in the strength of the vehicle frame and provides mounts 110 and 120 for air bump stops 115 and 125 which aid in the vehicle suspension system. Apparatus 100 further includes cross beam 130 that helps to keep the vehicle frame from bending or twisting as a result of the air bump stop mounting locations. FIG. 1 shows many components of apparatus 100 assembled including two frame supports 140 and 150, cross beam 130, two air bump stops 115 and 125, air bump impact pad 170, and air bump impact pad clamp 175. Not shown is another air bump impact pad and air bump impact pad clamp which would be positioned below air bump stop 115 and can be identical, opposite hand, or both, to air bump impact pad 170 and air bump impact pad clamp 175, for example. Apparatus 100, and the components thereof, can be made of metal, for example, steel, aluminum, or stainless steel, or some components can be steel and others aluminum. The components of apparatus 100 can be formed by cutting, welding, drilling, bending, filing, or a combination thereof, for instance. In a number of embodiments, a coating can be applied to various components of apparatus 100, such as one or more layers of paint, plating, or galvanizing, as examples. Further, in some embodiments, some components can be cast, machined, or both.

Figure 2:
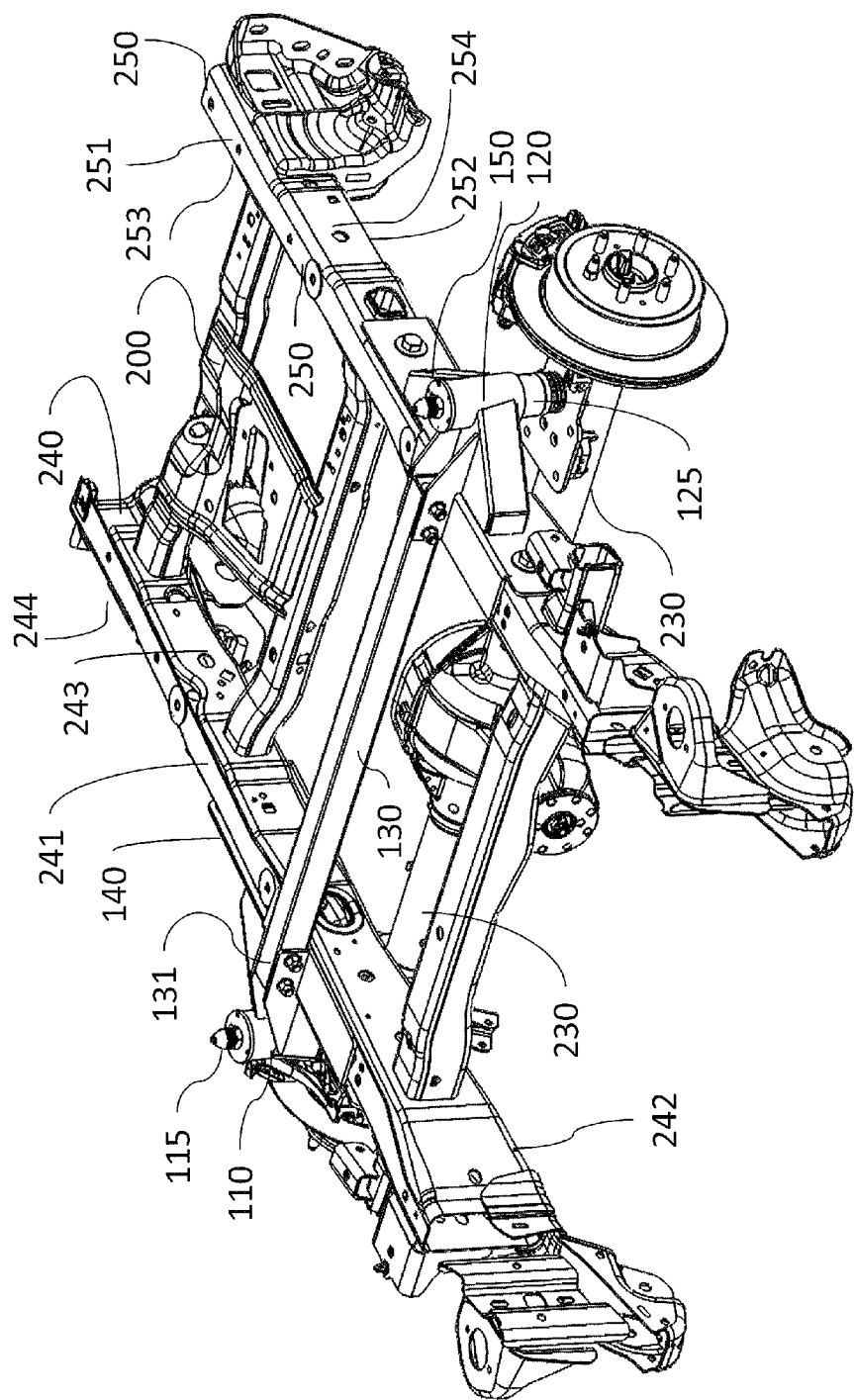
FIG. 2 is an isometric view of the kit or apparatus of FIG. 1 installed on a vehicle and supporting the frame of the vehicle while providing mounts for air bump stops that are also shown.
Figure 3:
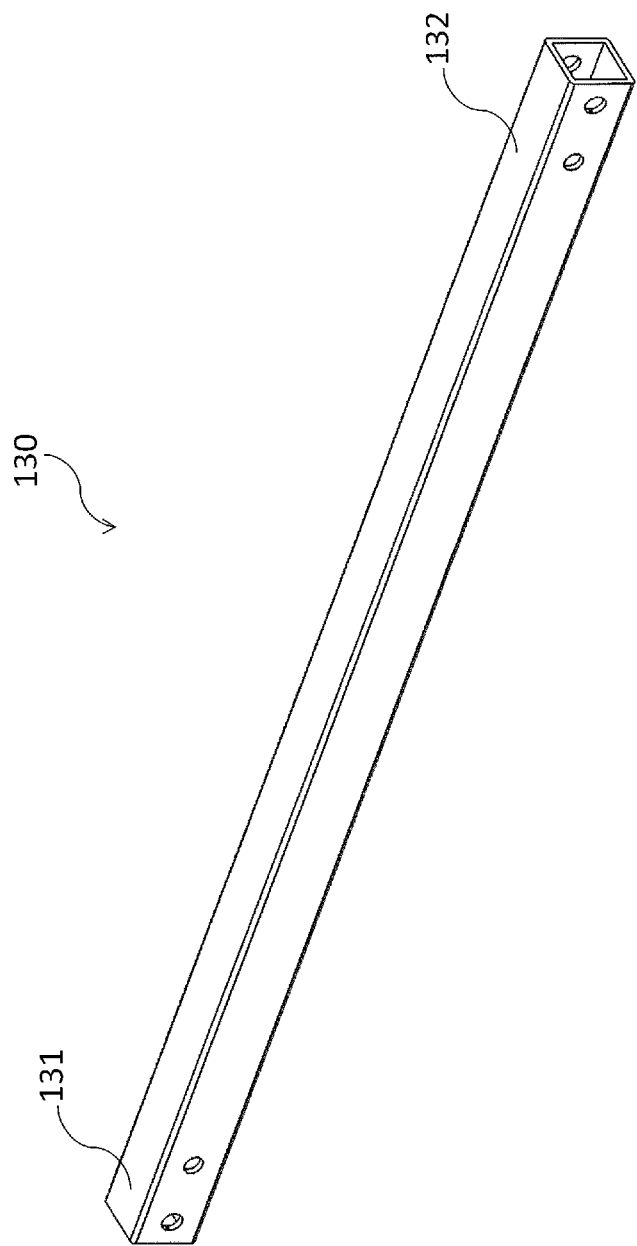
FIG. 3 is an isometric view of a cross beam of the kit or apparatus of FIGS. 1 and 2.
Figure 4:
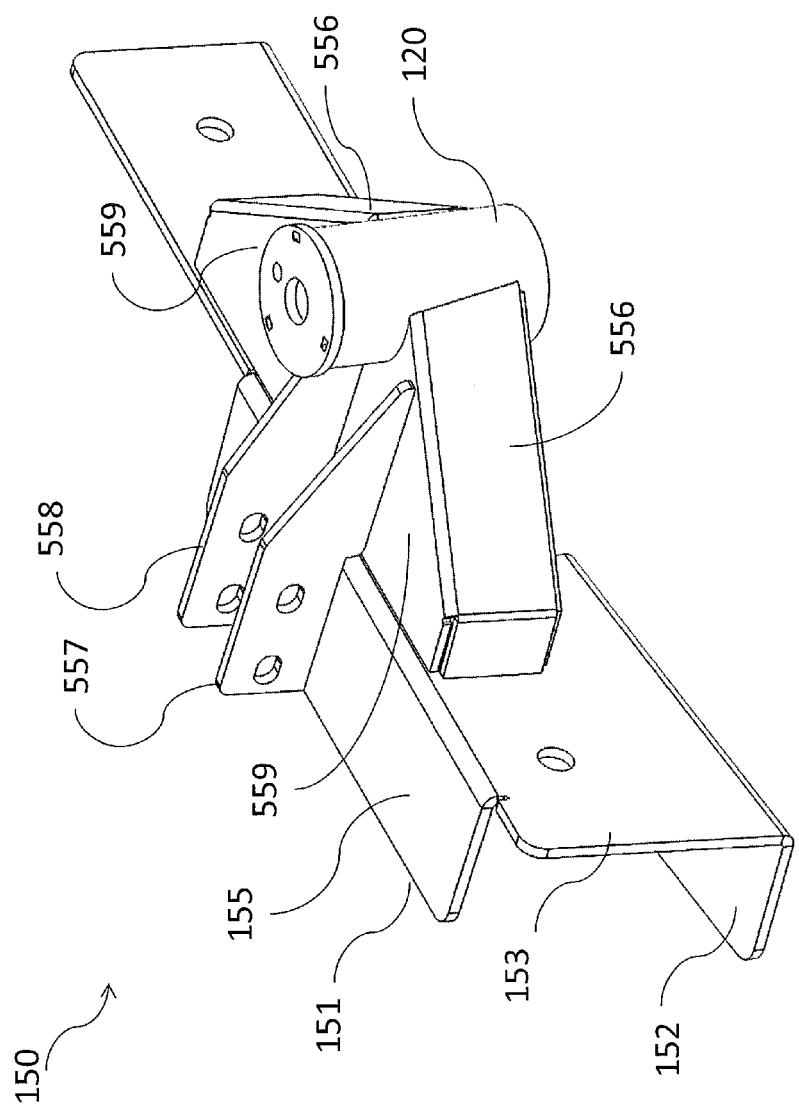
FIG. 4 is an isometric view of one of two similar or identical frame supports of the apparatus or kit of FIGS. 1 and 2.

FIG. 2 illustrates apparatus 100 installed on frame 200 of a motor vehicle. FIG. 3 is a detail view of cross beam 130, which, in the embodiment shown, is cut from square tubing, and as shown in FIG. 1, when apparatus 100 is assembled, cross beam 130 extends from one frame support (e.g., 140 or 150) to the other. In this embodiment, when installed on frame 200, cross beam 130 prevents frame 200 of the vehicle from bending or twisting (or both) when a force is applied to the air bump stops (e.g., 115, 125, or both). In the embodiment shown, a vertical force from the air bump stop is converted into an axial force though cross beam 130, torsional loading of the frame is converted to a bending moment in beam 130, or both. FIG. 4 is a closer view of frame support 150. As shown in FIG. 2, frame supports 140 and 150 mount directly to frame 200 and are attached thereto with hardware (e.g., the third and fourth sets of hardware described in more detail below). In other embodiments, frame supports can be permanently bonded with welding or adhesive to the frame, as other examples.

Figure 5:
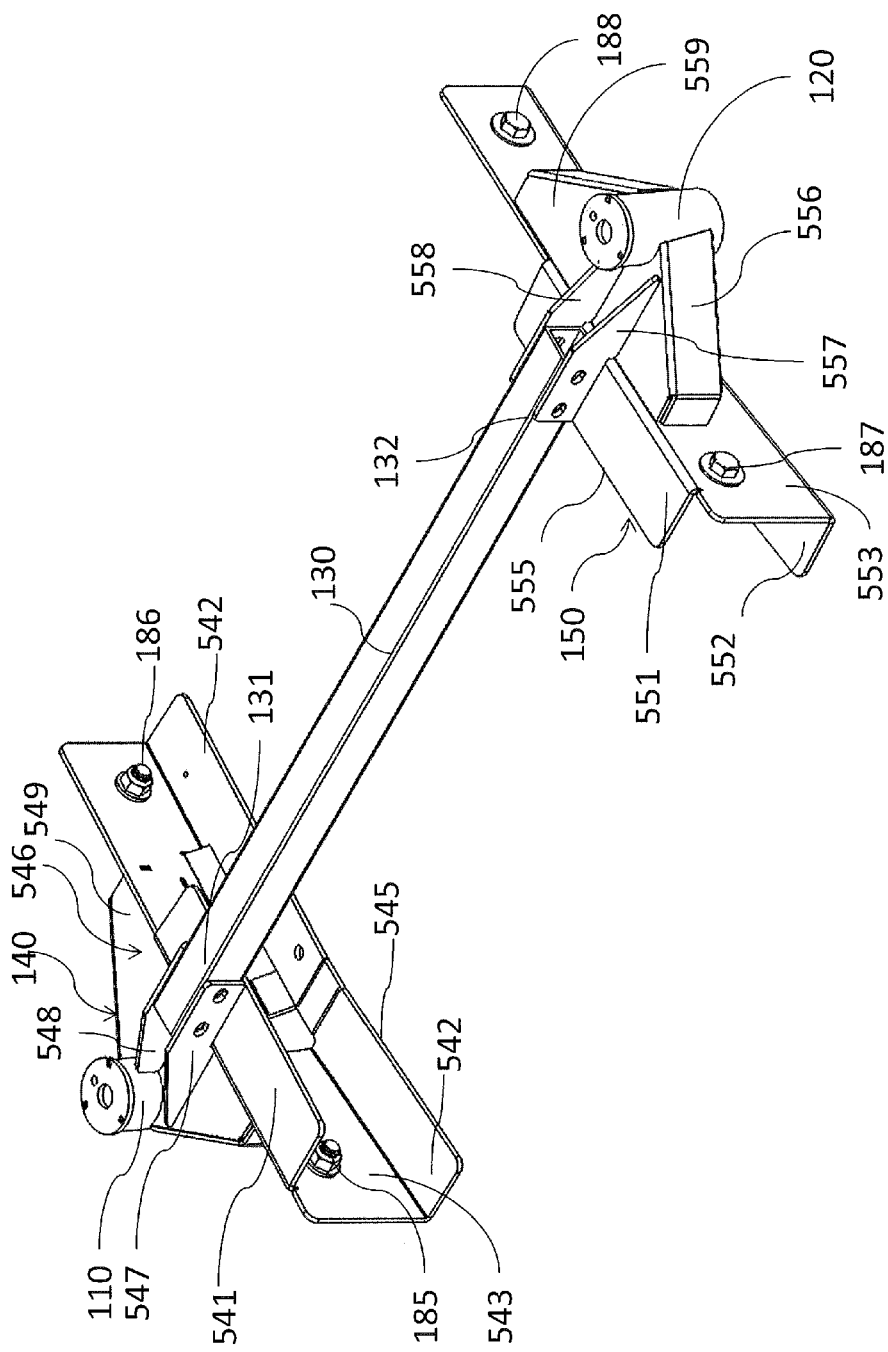
FIG. 5 is an isometric view of the kit or apparatus of FIGS. 1 and 2 with the air bump stops and certain bolts omitted and with certain parts of the frame supports (of FIG. 4) identified.
Figure 6:
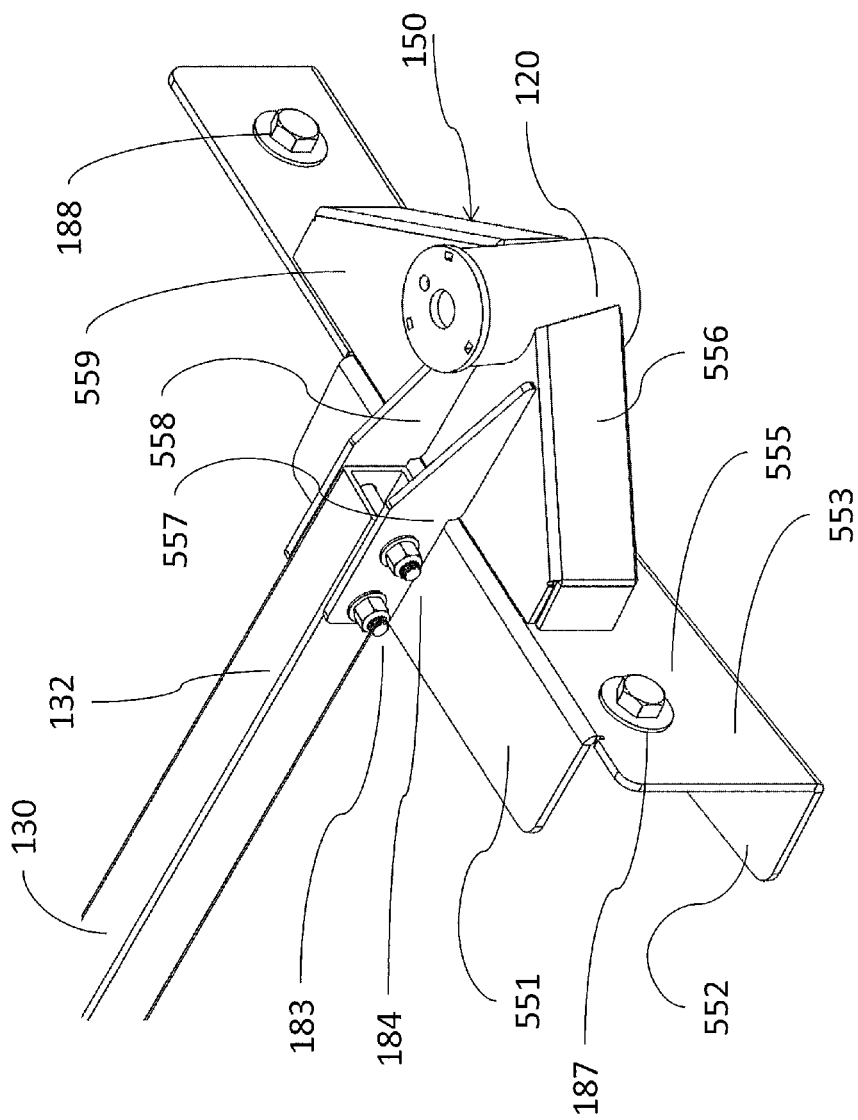
FIG. 6 is an isometric view of the frame support of FIG. 4 showing a closer view of the attachment to the cross beam of FIG. 3.

In the embodiment shown, each of frame supports 140 and 150 capture the frame on the top, outside and bottom of the frame. In various embodiments, the frame supports can add strength to the frame in torsion, axial loading, bending, or a combination thereof. FIG. 1 illustrates frame supports 140 and 150 with the bolts in place that would attach to frame 200 (not shown in FIG. 1 but shown in FIG. 2) with cross beam 130 bolted in place (e.g., with the first and second sets of hardware described in more detail below). In contrast, FIG. 5 illustrates frame supports 140 and 150 with the bolts in place that would attach to frame 200 (not shown in FIG. 5 but shown in FIG. 2), with cross beam 130 in place, but with the bolts that would secure cross beam 130 omitted. FIG. 2 illustrates how frame supports 140 and 150 are bolted directly to frame 200. FIG. 6 is a closer view illustrating frame support 150 bolted to cross beam 130, in this embodiment, with two bolts per side. The use of two bolts per side increases the strength in comparison with alternatives having fewer bolts. Other embodiments, however, can have 1, 3, 4, 5, 6, 7, 8, or more bolts or other fasteners per side, as other examples.

Figure 7:
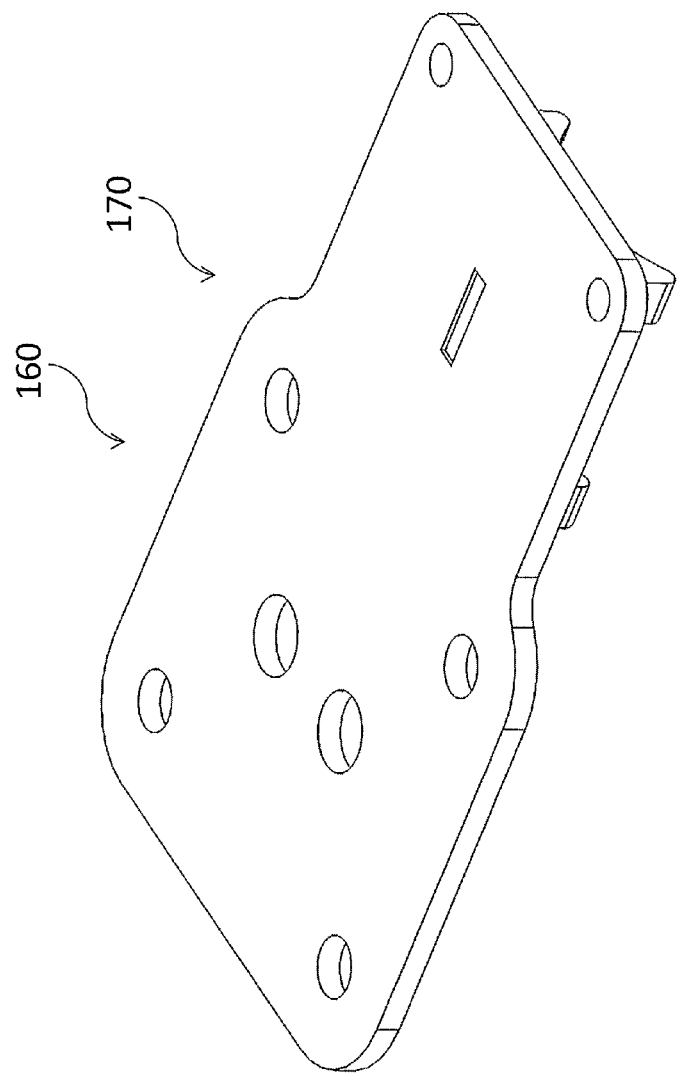
FIG. 7 is an isometric view of one of two similar or identical air bump impact pads of the kit or apparatus of FIGS. 1 and 2.
Figure 8:
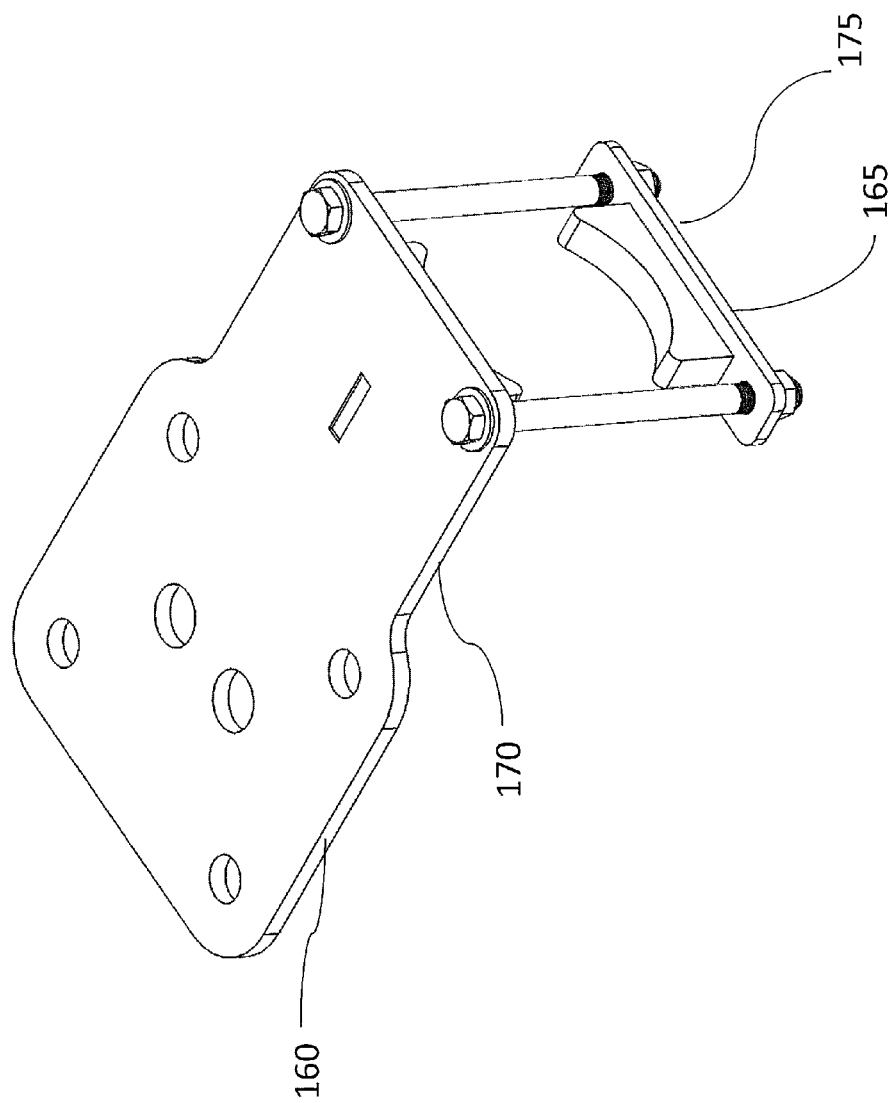
FIG. 8 is an isometric view of the air bump impact pad of FIG. 7 and an impact pad clamp for attaching the impact pad to the axle shown in FIG. 2.
Figure 9:
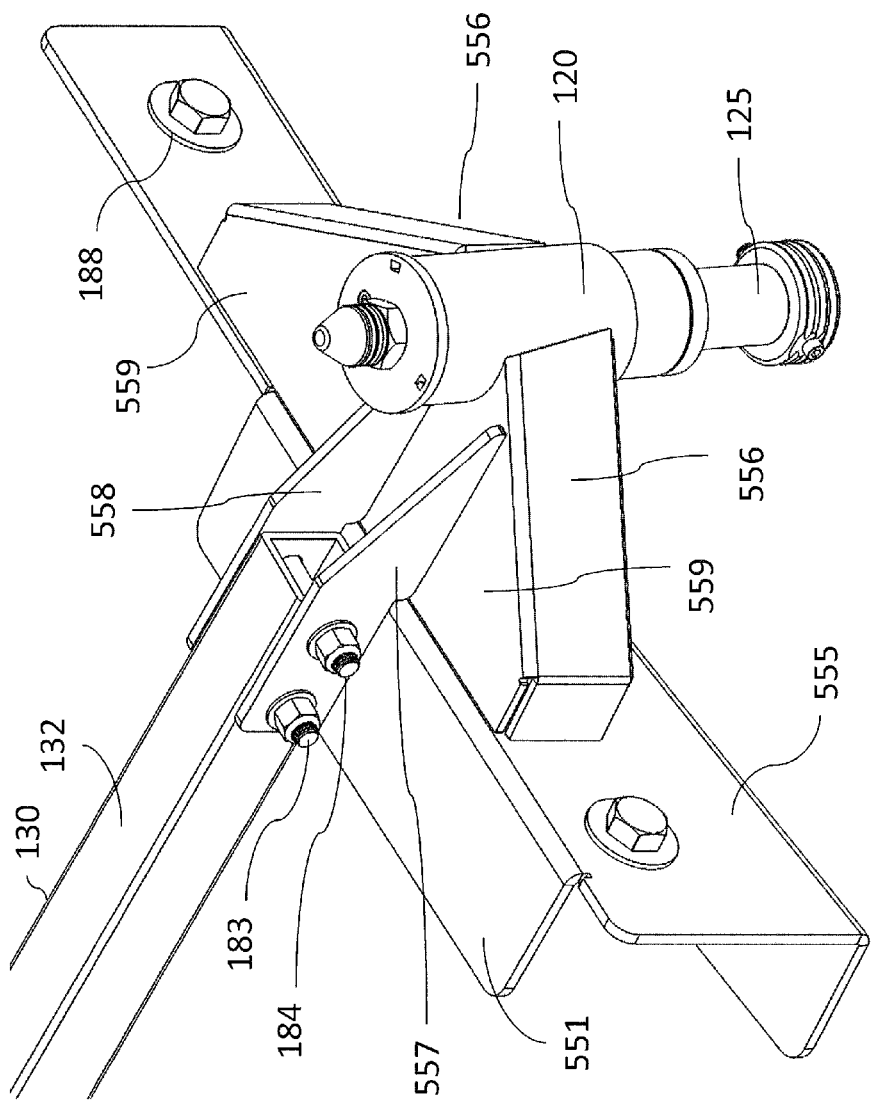
FIG. 9 is a closer isometric view of the frame support of FIGS. 4 and 6 showing the attachment to the cross beam of FIG. 3, the air bump stop, and the parts of the frame support mentioned above with reference to FIG. 5.

FIG. 7 illustrates impact pad 160 or 170 (which are identical in the embodiment shown) which help to distribute the impact forces from the vehicle suspension or axle (e.g., axle 230 shown in FIG. 2) impacting the air bump stops 115 and 125 (respectively) shown in FIG. 1. Other embodiments do not require impact pads. In certain other embodiments, for example, the air bump stop can impact the vehicle axle, spring, trailing arm, lower control arm, or another suspension component directly. FIG. 8 illustrates impact pad 160 or 170 along with impact pad mounting clamp 165 or 175, (which are also identical in this embodiment). In the embodiment illustrated, impact pad clamps 165 and 175 hold impact pads 160 and 170, respectively, stationary with respect to axle 230 shown in FIG. 2. FIG. 9 is a closer view of frame support 150, the end of cross beam 130, mount 120, and air bump stop 125 installed into mount 120 of frame support 150.

Referring to FIG. 2, apparatus 100 is an example of an apparatus for improving a motor vehicle having axle 230 and frame 200 extending over axle 230. Frame 200 can be a frame of a pickup truck, for example, such as a Ford F-150 or a Raptor, and axle 230 can be the rear axle of the vehicle, for instance. In other applications, the frame can be the frame of an SUV, as another example. Air bump stops can be particularly beneficial on vehicles that are driven on rough or uneven surfaces at a relatively-high speed. Air bump stops can be installed, for example, on vehicles that are often driven off road, such as light-duty trucks, including pickup trucks and sport utility vehicles (SUVs). Further, air bump stops can be added to vehicles used for off-road racing, including vehicles that are licensed for street and highway use as well as unlicensed vehicles. Air bump stops can also be added to recreational off-road vehicles, such as all terrain vehicles (ATVs), quads, side-by-sides, dune buggies, rock crawlers, and sandrails. On the other hand, air bump stops can also be used, on vehicles used primarily or exclusively on streets and highways, and can improve on-road performance, as well, particularly when the vehicle (e.g., a pickup truck) is loaded.

In the example shown, frame 200 includes right frame rail 240 and left frame rail 250. As mentioned and as shown in FIG. 1, apparatus 100 includes right-side frame support 140 having first mount 110 for first air bump stop 115, and left-side frame support 150 having second mount 120 for second air bump stop 125. Further, in this particular embodiment, apparatus 100 includes cross beam 130 having first end 131 and second end 132, shown, for example, in FIGS. 1 and 3. In the embodiment shown, apparatus 100 also includes first air bump stop 115, second air bump stop 125, first air bump impact pad 160 (shown in FIGS. 7 and 8, first air bump impact pad clamp 165 (shown in FIG. 8), second air bump impact pad 170, and second air bump impact pad clamp 175. In this embodiment, first and second air bump stops 115 and 125 are identical or interchangeable, first air bump impact pad 160 and second air bump impact pad 170 are identical or interchangeable, and first air bump impact pad clamp 165 and second air bump impact pad clamp 175 are identical or interchangeable. In other embodiments, such pairs of components may be mirror images or opposite hand, as other examples.

In a number of such embodiments, including the embodiment shown, right-side frame support 140 is configured to attach to right frame rail 240 above axle 230, left-side frame support 150 is configured to attach to left frame rail 250 above axle 230, and cross beam 130 is configured to extend substantially parallel to axle 230, when apparatus 100 is installed on the motor vehicle, from right-side frame support 140 to left-side frame support 150, with first end 131 attaching to right-side frame support 140 and second end 132 attaching to left-side frame support 150. As used herein a device or component being "configured" to perform a particular function or task means that the device or component was made specifically to perform that function or task. For example, the device or component may have been shaped, bent, cut, welded, cast, molded, drilled, or a combination thereof, with the intent to perform the function or task identified, either alone or in conjunction with other components. Mere raw materials or stock that could be formed to perform the function or task are not considered to be "configured" to perform that function or task, as used herein. Still further, as used herein, "parallel" means parallel to within 10 degrees, and "substantially parallel" means parallel to within 20 degrees. Even further, in a number of embodiments, including the embodiment shown, first air bump impact pad 160 (shown in FIGS. 7 and 8) is configured to attach to axle 230 below first air bump stop 115, and first air bump impact pad clamp 165 is configured to attach first air bump impact pad 160 to axle 230. Similarly, in a number of embodiments, including the embodiment shown, second air bump impact pad 170 is configured to attach to axle 230 below second air bump stop 125, and second air bump impact pad clamp 175 is configured to attach second air bump impact pad 170 to axle 230.

Still further, in the embodiment shown in FIG. 2, right frame rail 240 has top 241, bottom 242, inboard side 243, and outboard side 244. Similarly, left frame rail 250 has top 251, bottom 252, inboard side 253, and outboard 254 side. In this embodiment, outboard side 244 of right frame rail 240 is similar to outboard side 254 of left frame rail 250 and inboard side 253 of left frame rail 250 is similar to inboard side 243 of right frame rail 240. Moreover, bottoms 242 and 252 are similar to tops 241 and 251 of frame rails 240 and 250. Furthermore, in various embodiments, including the embodiment shown, right-side frame support 140, that is configured to attach to right frame rail 240 above axle 230, is configured to support right frame rail 240 at top 241, at bottom 242, and at outboard side 244 of right frame rail 240, and left-side frame support 150, that is configured to attach to left frame rail 250 above axle 230, is configured to support left frame rail 250 at top 251, at bottom 252, and at outboard side 254 of left frame rail 250.

As used herein, a first component "supports", or is "supporting" a second component at a particular location when the first component attaches to the second component at that location (e.g., with hardware or bolts) or when the first component exerts a significant force on the second component at that location when the second component elastically deforms toward the first component at that location. Further, in this context, as used herein, a force exerted on the frame of a vehicle is considered to be significant if the force changes the amount of a load (e.g., dynamic load) that the frame is capable of withstanding without plastic deformation or fatigue by at least ten percent. Even further still, in various embodiments, including the embodiment shown, when apparatus 100 is installed on the motor vehicle, first mount 110 for first air bump stop 115 is on the outboard side of right frame rail 240 (i.e., outboard of outboard side 244), and second mount 120 for second air bump stop 125 is on the outboard side of left frame rail 250 (i.e., outboard of outboard side 254). As used herein, "outboard" means farther from a centerline of the frame that is parallel to frame rails (e.g., 240 and 250) and perpendicular (e.g., when viewed from above) to the axle (e.g., 230).

Moreover, in various embodiments, the apparatus further includes a first set of hardware for attaching the first end of the cross beam to the right-side frame support, and a second set of hardware for attaching the second end of the cross beam to the right-side frame support. As used herein, the term "hardware" includes fasteners, such as bolts, nuts, screws, pins, and cotter keys, and can include washers, lock washers, or both. A number of embodiments include fasteners that can be non-destructively removed and reused, such as bolts, nuts, screws, and pins. As shown in FIG. 1, for example, apparatus 100 includes a first set of hardware that includes bolts 181 and 182, attaching first end 131 of cross beam 130 to right-side frame support 140, and a second set of hardware that includes bolts 183 and 184, attaching second end 132 of cross beam 130 to left-side frame support 150. Various bolts, mentioned herein, can include appropriate nuts and washers, and in some embodiments, lock washers or self-locking nuts are used. Further, in particular embodiments, a thread locking fluid or locking compound can be used. In a number of embodiments, the apparatus can be shipped (e.g., from the fabricator or distributor to the installer or the retailer, or from the retailer to the end user) without the right-side frame support or the left-side frame support attached to the cross beam. In the embodiment illustrated, for example. apparatus 100 can be shipped without right-side frame support 140, left-side frame support 150, or either frame support, attached to cross beam 130, and these components can be attached to each other with bolts 181, 182, 183, and 184 when apparatus 100 is installed on the vehicle.

Furthermore, some embodiments further include a third set of hardware for attaching the right-side frame support to the right frame rail above the axle, and a fourth set of hardware for attaching the left-side frame support to the left frame rail above the axle. For example, in the embodiment illustrated (e.g., in FIG. 1), apparatus 100 includes a third set of hardware that includes bolts 185 and 186 for attaching right-side frame support 140 to right frame rail 240 above axle 230, and a fourth set of hardware that includes bolts 187 and 188 for attaching left-side frame support 150 to left frame rail 250 above axle 230. In FIG. 2, apparatus 100 is shown attached to frame 200 in this manner with bolts 185, 186, 187, and 188. In this particular embodiment, each of these sets of hardware includes two bolts, but in other embodiments, a set of hardware can include 1, 3, 4, 5, 6, 7, 8, 9, 10, or 12 bolts (e.g., with nuts), or other fasteners, as other examples.

Moreover, in a number of embodiments, each of the right-side frame support and the left-side frame support has a channel portion that includes a first flange, a second flange, and a web. As shown in FIG. 5, for example, left side frame support 140 includes channel portion 545 that includes first flange 541, second flange 542, and web 543. Further, as shown in FIGS. 4-6, for example, right side frame support 150 includes channel portion 555 that includes first flange 551, second flange 552, and web 553. Even further, in a number of embodiments, each frame support has a hollow box portion extending from the web to the air bump stop mount, two parallel gusset plates, or both. In the embodiment shown, for instance, right-side frame support 140 includes hollow box portion 546 extending from web 543 to air bump stop mount 110, and two parallel gusset plates 547 and 548 welded to first flange 541 and to box 546. Similarly, in the embodiment shown, left-side frame support 150 includes hollow box portion 556 extending from web 553 to air bump stop mount 120, and two parallel gusset plates 557 and 558 welded to first flange 551 and to box 556. Further, in the embodiment depicted, when apparatus 100 is installed on the motor vehicle (e.g., having frame 200), first end 131 of cross beam 130 fits between and attaches to (e.g., with bolts 181 and 182) parallel gusset plates 547 and 548 of right-side frame support 140, and second end 132 of cross beam 130 fits between and attaches to (e.g., with bolts 183 and 184) parallel gusset plates 557 and 558 of left-side frame support 150.

In various embodiments, a apparatus for improving a motor vehicle or a frame support and suspension stop, as examples, can be sold as a kit, for instance, for improving a motor vehicle. Such a kit can be advertised, sold, and shipped, for example, partially or fully disassembled (e.g., where held together with hardware or bolts). For instance, apparatus 100 can be sold as a kit for improving a motor vehicle. In addition, various alternatives to apparatus 100, including examples described herein, can be sold as a kit for improving a motor vehicle. Particular embodiments provide various kits for improving a motor vehicle having an axle (e.g., 230) and a frame (e.g., 200) extending over the axle, the frame include a right frame rail (e.g., 240) and a left frame rail (e.g., 250). Such a kit can include, for example, right-side frame support 140, left-side frame support 150, and cross beam 130. In the embodiment shown, right-side frame support 140, when the kit is installed on the motor vehicle, attaches to right frame rail 240 above axle 230 and supports right frame rail 240. In the embodiment shown, right-side frame support 140 also includes first mount 110 for first air bump stop 115. Similarly, left-side frame support 150, when the kit is installed on the motor vehicle, attaches to left frame rail 250 above axle 230 and supports left frame rail 250, and left-side frame support 150 includes second mount 120 for second air bump stop 125. Moreover, in this particular embodiment, cross beam 130 has first end 131 and second end 132, and extends, when the kit is installed on the motor vehicle, substantially parallel to axle 230 from right-side frame support 140 to left-side frame support 150 with first end 131 attached (e.g., with bolts 181 and 182) to right-side frame support 140 and second end 132 attached (e.g., with bolts 183 and 184) to left-side frame support 150. Other embodiments can be similar or can differ.

In some embodiments, the kit (e.g., for improving a motor vehicle) further includes first air bump stop 115 and second air bump stop 125. Further, certain embodiments can include first air bump impact pad 160 (e.g., shown in FIGS. 7 and 8) that, when the kit is installed on the motor vehicle, attaches to axle 230 below first air bump stop 115, and first air bump impact pad clamp 165 that, when the kit is installed on the motor vehicle, attaches first air bump impact pad 160 to axle 230. Such embodiments can also include second air bump impact pad 170 that, when the kit is installed on the motor vehicle, attaches to axle 230 below second air bump stop 125 (e.g., as shown in FIG. 1), and second air bump impact pad clamp 175 that, when the kit is installed on the motor vehicle, attaches second air bump impact pad 170 to axle 230 (e.g., as shown in FIG. 2). Even further, in some embodiments, such a kit can further include a first set of hardware (e.g., bolts 181 and 182) that, when the kit is installed on the motor vehicle, attaches the first end (e.g., 131) of the cross beam (e.g., 130) to the right-side frame support (e.g., 140), and a second set of hardware (e.g., bolts 183 and 184) that, when the kit is installed on the motor vehicle, attaches the second end (e.g., 132) of the cross beam (e.g., 130) to the left-side frame support (e.g., 150). In a number of embodiments, the kit (e.g., for apparatus 100) is shipped without the right-side frame support (e.g., 140) or the left-side frame support (e.g., 150) (or either) attached to the cross beam (e.g., 130). Even further still, in certain embodiments, the kit further includes a third set of hardware (e.g., bolts 185 and 186) that, when the kit is installed on the motor vehicle, attaches the right-side frame support (e.g., 140) to the right frame rail (e.g., 240, for instance, above axle 230), and a fourth set of hardware (e.g., bolts 187 and 188) that, when the kit is installed on the motor vehicle, attaches the left-side frame support (e.g., 150) to the left frame rail (e.g., 250, for instance, above axle 230). In other embodiments, however, the air bump stops, some or all of the hardware, air bump impact pads, impact pad clamps, or a combination thereof, are sold separately.

Moreover, in the embodiment shown, right frame rail 240 has top 241, bottom 242, inboard side 243, and outboard side 244, left frame rail 250 has top 251, bottom 252, inboard side 253, and outboard side 254. In various embodiments, when the kit is installed on the motor vehicle, the right-side frame support (e.g., 140), that attaches to the right frame rail (e.g., 240) above the axle (e.g., 230), supports the right frame rail (e.g., 240) at the top (e.g., 241), at the bottom (e.g., 242), and at the outboard side (e.g., 244) of the right frame rail (e.g., 240). Similarly, in a number of embodiments, the left-side frame support (e.g., 150), that attaches to the left frame rail (e.g., 250) above the axle (e.g., 230), supports the left frame rail (e.g., 250) at the top (e.g., 251), at the bottom (e.g., 252), and at the outboard side (e.g., 254) of the left frame rail (e.g., 250). Furthermore, in particular embodiments, when the kit is installed on the motor vehicle, the first mount (e.g., 110) for the first air bump stop (e.g., 115) is on the outboard side of the right frame rail (e.g., 240), and the second mount (e.g., 120) for the second air bump stop (e.g., 225) is on the outboard side of the left frame rail (e.g., 250).

Further, in the embodiment shown (e.g., in FIG. 5), each of right-side frame support 140 and left-side frame support 150 has a substantially horizontal channel portion (e.g., 545 and 555 respectively) including a substantially horizontal top flange (e.g., 541 and 551 respectively), a substantially horizontal bottom flange (e.g., 542 and 552 respectively), and a substantially vertical web (e.g., 543 and 553 respectively), a hollow box portion (e.g., 546 and 556 respectively) extending from the web to the air bump stop mount (e.g., 110 and 120 respectively), the box portion including a box top (e.g., 549 and 559 respectively), and two parallel gusset plates (e.g., 547 and 548, and 557 and 558, respectively) welded to the top flange (e.g., 541 and 551 respectively) and to the box top (e.g., 549 and 559 respectively). Still further, in the embodiment shown, when the kit (e.g., for apparatus 100) is installed on the motor vehicle, first end 131 of cross beam 130 fits between and attaches to (e.g., with bolts 181 and 182 shown in FIG. 1) the two parallel gusset plates 547 and 548 (e.g., shown in FIG. 5) of right-side frame support 140, and second end 132 of cross beam 130 fits between and attaches to (e.g., with bolts 183 and 184 shown in FIGS. 1, 6, and 9) the two parallel gusset plates 557 and 558 (e.g., shown in FIGS. 4-6 and 9) of left-side frame support 150. Even further still, as used herein, when referring to horizontal, vertical, or another angle, "substantially" means within 20 degrees. In addition, as used herein, directional words such as above, below, top, bottom, side, horizontal, and vertical, are referring to directions when the kit, apparatus, or product is properly installed on the vehicle and the vehicle is upright on a level surface. Further, as used herein, when so situated, a first item being "above" a second item means that at least one point on the first item is directly above at least one point on the second item. Similarly, as used herein, a first item being "below" a second item means that at least one point on the first item is directly below at least one point on the second item.

Figure 10:
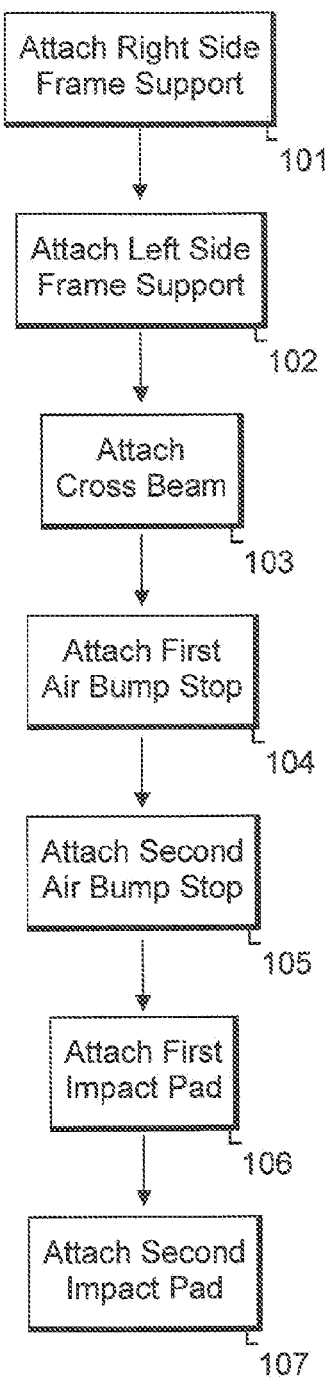
FIG. 10 is a flow chart illustrating an example of a method of improving a motor vehicle.

Other embodiments include various methods, for example, of improving a motor vehicle having an axle and a frame extending over the axle. For instance, FIG. 10 illustrates an example of a method of improving a motor vehicle having an axle (e.g., 230) and a frame (e.g., 200) extending over the axle, method 1000. For method 1000, the frame can include a right frame rail and a left frame rail. Method 1000 includes certain acts, which can be performed in the order shown in FIG. 10 or in some embodiments, can be performed in another suitable order. In the example of method 1000, these acts include act 101 of attaching a right-side frame support (e.g., 140) to the right frame rail (e.g., 240), for instance, above the axle (e.g., 230). In various embodiments, the right-side frame support includes a first mount (e.g., 110). Further, in this particular embodiment, method 1000 includes act 102 of attaching a left-side frame support (e.g., 150) to the left frame rail (e.g., 250, for instance, above the axle (e.g., 230). In a number of embodiments, the left-side frame support can include a second mount (e.g., 120). Further still, in this embodiment, method 1000 includes act 103 of attaching a cross beam (e.g., 130), for instance, to the right-side frame support (e.g., 140) and to the left-side frame support (e.g., 150), for example, so that the cross beam extends from the right-side frame support to the left-side frame support and is substantially parallel to the axle. In addition, a number of embodiments can include, and method 1000 includes, acts 104 of attaching a first air bump stop (e.g., 115), for instance, to the first mount (e.g., 110) on the right-side frame support (e.g., 140), and act 105 of attaching a second air bump stop (e.g., 125), for instance, to the second mount (e.g., 120) on the left-side frame support (e.g., 150).

Further, some embodiments can include acts of attaching a first air bump impact pad to the axle, for instance, below the first air bump stop, and attaching a second air bump impact pad to the axle, for instance, below the second air bump stop, for example, using air bump impact pad clamps. In the example depicted, method 1000 further includes act 106 of attaching a first air bump impact pad (e.g., 160) to the axle (e.g., 230) below the first air bump stop (e.g., 115) using a first air bump impact pad clamp (e.g., 165) that attaches the first air bump impact pad (e.g., 160) to the axle (e.g., 230). Moreover, method 1000 further includes act 107 of attaching a second air bump impact pad (e.g., 170) to the axle (e.g., 230) below the second air bump stop (e.g., 125) using a second air bump impact pad clamp (e.g., 175) that attaches the second air bump impact pad (e.g., 170) to the axle (e.g., 230).

Further still, in certain embodiments, act 101 of attaching the right-side frame support (e.g., 140) to the right frame rail (e.g., 240), for instance, above the axle (e.g., 230) includes positioning the first mount (e.g., 110) for the first air bump stop (e.g., 115) on the outboard side of the right frame rail (e.g., 240), and supporting the right frame rail (e.g., 240) at least at the bottom (e.g., 242) and at the outboard side (e.g., 244) of the right frame rail. Similarly, in a number of embodiments, act 102 of attaching the left-side frame support (e.g., 150) to the left frame rail (e.g., 250), for instance, above the axle (e.g., 230) includes positioning the second mount (e.g., 120) for the second air bump stop (e.g., 125) on the outboard side of the left frame rail (e.g., 250), and supporting the left frame rail at least at the bottom (e.g., 252) and at the outboard side (e.g., 254) of the left frame rail. Further still, in various embodiments of method 1000, act 103 of attaching the cross beam (e.g., 130) to the right-side frame support (e.g., 140) and to the left-side frame support (e.g., 150) so that the cross beam is substantially parallel to the axle can include, (e.g., in this order or in another suitable order), fitting a first end (e.g., 131) of the cross beam (e.g., 130) between two parallel gusset plates (e.g., 547 and 548) on the right-side frame support (e.g., 140), and fitting a second end (e.g., 132) of the cross beam (e.g., 130) between two parallel gusset plates (e.g., 557 and 558) on the left-side frame support (e.g., 150). Even further, in certain embodiments, act 103 can include attaching the first end (e.g., 131) of the cross beam (e.g., 130) to the two parallel gusset plates (e.g., 547 and 548) on the right-side frame support (e.g., 140), and attaching the second end (e.g., 132) of the cross beam (e.g., 130) to the two parallel gusset plates (e.g., 557 and 558) on the left-side frame support (e.g., 150). This can be accomplished, for example, in the embodiment illustrated, with bolts 181 and 182 for first end 131 and gusset plates 547 and 548, and with bolts 183 and 184 for second end 132 and gusset plates 557 and 558.

This disclosure illustrates, among other things, examples of certain embodiments of the invention and particular aspects thereof. Other embodiments may differ. Various embodiments may include aspects shown in the drawings, described in the text, shown or described in other documents that are identified, known in the art, or a combination thereof, as examples. Moreover, certain procedures may include acts such as obtaining or providing various structural components described herein and obtaining or providing components that perform functions described herein. Furthermore, various embodiments include advertising and selling products that perform functions described herein, that contain structure described herein, or that include instructions to perform acts or functions described herein, as examples. The subject matter described herein also includes various means for accomplishing the various functions or acts described herein or that are apparent from the structure and acts described. Further, as used herein, the word "or", except where indicated otherwise, does not imply that the alternatives listed are mutually exclusive. Even further, where alternatives are listed herein, it should be understood that in some embodiments, fewer alternatives may be available, or in particular embodiments, just one alternative may be available, as examples.

Further, various methods in accordance with different embodiments include acts of selecting, making, positioning, assembling, or using certain components, as examples. Other embodiments may include performing other of these acts on the same or different components, or may include fabricating, assembling, obtaining, providing, ordering, receiving, shipping, or selling such components, or other components described herein or known in the art, as other examples. Further, different embodiments include various combinations of the components, features, and acts described herein or shown in the drawings, for example. Other embodiments may be apparent to a person of ordinary skill in the art having studied this document.

What is claimed is:

1. An apparatus for a motor vehicle having an axle and a frame extending over the axle, the frame comprising a right frame rail and a left frame rail, the apparatus comprising:
a right-side frame support comprising a first mount for a first air bump stop;
a left-side frame support comprising a second mount for a second air bump stop;
a cross beam having a first end and a second end;
the first air bump stop;
the second air bump stop;
a first air bump impact pad;
a first air bump impact pad clamp;
a second air bump impact pad; and
a second air bump impact pad clamp;
wherein each of the right-side frame support and the left-side frame support comprises two parallel gusset plates and when the apparatus is installed on the motor vehicle, the first end of the cross beam fits between and attaches to the two parallel gusset plates of the right-side frame support; and the second end of the cross beam fits between and attaches to the two parallel gusset plates of the left-side frame support.

2. The apparatus of claim 1 wherein:
each of the right-side frame support and the left-side frame support comprises:
a channel portion comprising a first flange, a second flange, and a web; and
a hollow box portion extending from the web to the first mount; and
the two parallel gusset plates are welded to the first flange and to the hollow box portion.

3. The apparatus of claim 1 further comprising a first set of hardware for attaching the first end of the cross beam to the right-side frame support, and a second set of hardware for attaching the second end of the cross beam to the left-side frame support; wherein the apparatus is shipped without the right-side frame support or the left-side frame support attached to the cross beam.

4. The apparatus of claim 3 further comprising a third set of hardware for attaching the right-side frame support to the right frame rail above the axle, and a fourth set of hardware for attaching the left-side frame support to the left frame rail above the axle.

5. The apparatus of claim 1 wherein:
the right-side frame support is configured to attach to the right frame rail above the axle;
the left-side frame support is configured to attach to the left frame rail above the axle;
the cross beam is configured to extend substantially parallel to the axle, when the apparatus is installed on the motor vehicle, from the right-side frame support to the left-side frame support, with the first end attaching to the right-side frame support and the second end attaching to the left-side frame support;
the first air bump impact pad is configured to attach to the axle below the first air bump stop;
the first air bump impact pad clamp is configured to attach the first air bump impact pad to the axle;
the second air bump impact pad is configured to attach to the axle below the second air bump stop; and
the second air bump impact pad clamp is configured to attach the second air bump impact pad to the axle.

6. The apparatus of claim 5 wherein:
the right frame rail comprises a top, a bottom, an inboard side, and an outboard side;
the left frame rail comprises a top, a bottom, an inboard side, and an outboard side;
the right-side frame support, that is configured to attach to the right frame rail above the axle, is configured to support the right frame rail at the top, at the bottom, and at the outboard side of the right frame rail; and
the left-side frame support, that is configured to attach to the left frame rail above the axle, is configured to support the left frame rail at the top, at the bottom, and at the outboard side of the left frame rail.

7. The apparatus of claim 6 wherein:
the right frame rail comprises a top, a bottom, an inboard side, and an outboard side;
the left frame rail comprises a top, a bottom, an inboard side, and an outboard side;
when the apparatus is installed on the motor vehicle, the first mount for the first air bump stop is on the outboard side of the right frame rail; and
when the apparatus is installed on the motor vehicle, the second mount for the second air bump stop is on the outboard side of the left frame rail.

8. A kit for a motor vehicle having an axle and a frame extending over the axle, the frame comprising a right frame rail and a left frame rail, the kit comprising:
- a right-side frame support that, when the kit is installed on the motor vehicle, attaches to the right frame rail above the axle and supports the right frame rail, the right-side frame support comprising a first mount for a first air bump stop;
- a left-side frame support that, when the kit is installed on the motor vehicle, attaches to the left frame rail above the axle and supports the left frame rail, the left-side frame support comprising a second mount for a second air bump stop; and
- a cross beam having a first end and a second end, the cross beam extending, when the kit is installed on the motor vehicle, substantially parallel to the axle from the right-side frame support to the left-side frame support with the first end attaching to the right-side frame support and the second end attaching to the left-side frame support;
- wherein each of the right-side frame support and the left-side frame support comprises:
  - a substantially horizontal channel portion comprising a substantially horizontal top flange, a substantially horizontal bottom flange, and a substantially vertical web; and
  - a mount portion extending from the web to the first mount, the mount portion comprising a mount top.

9. The kit of claim 8 further comprising the first air bump stop and the second air bump stop.

10. The kit of claim 8 further comprising:
- a first air bump impact pad that, when the kit is installed on the motor vehicle, attaches to the axle below the first air bump stop;
- a first air bump impact pad clamp that, when the kit is installed on the motor vehicle, attaches the first air bump impact pad to the axle;
- a second air bump impact pad that, when the kit is installed on the motor vehicle, attaches to the axle below the second air bump stop; and
- a second air bump impact pad clamp that, when the kit is installed on the motor vehicle, attaches the second air bump impact pad to the axle.

11. The kit of claim 8 further comprising a first set of hardware that, when the kit is installed on the motor vehicle, attaches the first end of the cross beam to the right-side frame support, and a second set of hardware that, when the kit is installed on the motor vehicle, attaches the second end of the cross beam to the left-side frame support; wherein the kit is shipped without the right-side frame support or the left-side frame support attached to the cross beam.

12. The kit of claim 11 further comprising a third set of hardware that, when the kit is installed on the motor vehicle, attaches the right-side frame support to the right frame rail above the axle, and a fourth set of hardware that, when the kit is installed on the motor vehicle, attaches the left-side frame support to the left frame rail above the axle.

13. The kit of claim 8 wherein:
- the right frame rail comprises a top, a bottom, an inboard side, and an outboard side;
- the left frame rail comprises a top, a bottom, an inboard side, and an outboard side;
- when the kit is installed on the motor vehicle, the right-side frame support, that attaches to the right frame rail above the axle, supports the right frame rail at the top, at the bottom, and at the outboard side of the right frame rail; and
- when the kit is installed on the motor vehicle, the left-side frame support, that attaches to the left frame rail above the axle, supports the left frame rail at the top, at the bottom, and at the outboard side of the left frame rail.

14. The kit of claim 8 wherein:
- the right frame rail comprises a top, a bottom, an inboard side, and an outboard side;
- the left frame rail comprises a top, a bottom, an inboard side, and an outboard side;
- when the kit is installed on the motor vehicle, the first mount for the first air bump stop is on the outboard side of the right frame rail; and
- when the kit is installed on the motor vehicle, the second mount for the second air bump stop is on the outboard side of the left frame rail.

15. The kit of claim 8 wherein each of the right-side frame support and the left-side frame support comprises two parallel gusset plates welded to the top flange and to the mount top and, when the kit is installed on the motor vehicle, the first end of the cross beam fits between and attaches to the two parallel gusset plates of the right-side frame support; and the second end of the cross beam fits between and attaches to the two parallel gusset plates of the left-side frame support.

16. A method for a motor vehicle having an axle and a frame extending over the axle, the frame comprising a right frame rail and a left frame rail, the method comprising, in any order, at least the acts of:
- attaching a right-side frame support to the right frame rail above the axle, the right-side frame support comprising a first mount;
- attaching a left-side frame support to the left frame rail above the axle, the left-side frame support comprising a second mount;
- attaching a cross beam to the right-side frame support and to the left-side frame support so that the cross beam extends from the right-side frame support to the left-side frame support and is substantially parallel to the axle, including:
  - fitting a first end of the cross beam between two parallel gusset plates on the right-side frame support; and
  - attaching the first end of the cross beam to the two parallel gusset plates on the right-side frame support;
- attaching a first air bump stop to the first mount on the right-side frame support; and
- attaching a second air bump stop to the second mount on the left-side frame support.

17. The method of claim 16 further comprising, in any order, at least the acts of:
- attaching a first air bump impact pad to the axle below the first air bump stop using a first air bump impact pad clamp that attaches the first air bump impact pad to the axle; and
- attaching a second air bump impact pad to the axle below the second air bump stop using a second air bump impact pad clamp that attaches the second air bump impact pad to the axle.

18. The method of claim 16 wherein:
- the right frame rail comprises a top, a bottom, an inboard side, and an outboard side;
- the left frame rail comprises a top, a bottom, an inboard side, and an outboard side;
- the act of attaching the right-side frame support to the right frame rail above the axle comprises:
  - positioning the first mount for the first air bump stop on the outboard side of the right frame rail; and
  - supporting the right frame rail at least at the bottom and at the outboard side of the right frame rail; and the act of attaching the left-side frame support to the left frame rail above the axle comprises:
: positioning the second mount for the second air bump stop on the outboard side of the left frame rail; and
: supporting the left frame rail at least at the bottom and at the outboard side of the left frame rail.

19. The method of claim 16 wherein the act of attaching the cross beam to the right-side frame support and to the left-side frame support so that the cross beam is substantially parallel to the axle comprises, in any order:
: fitting a second end of the cross beam between two parallel gusset plates on the left-side frame support; and
: attaching the second end of the cross beam to the two parallel gusset plates on the left-side frame support.

* * * * *